(12) United States Patent
Lu et al.

(10) Patent No.: US 11,420,894 B2
(45) Date of Patent: Aug. 23, 2022

(54) BRITTLE OBJECT CUTTING APPARATUS AND CUTTING METHOD THEREOF

(71) Applicant: Nanoplus Ltd., Grand Cayman (KY)

(72) Inventors: Hung-Tu Lu, Taipei (TW); Vladimir Kondratenko, Moscow (RU); Alexander Naumov, Moscow (RU); Chih-Peng Hsu, Taoyuan (TW); Wei-Nung Hsu, Taipei (TW)

(73) Assignee: NANOPLUS LTD., Grand Cayman (KY)

( * ) Notice: Subject to any disclaimer, the term of this patent is extended or adjusted under 35 U.S.C. 154(b) by 0 days.

(21) Appl. No.: 15/811,180

(22) Filed: Nov. 13, 2017

(65) Prior Publication Data

US 2018/0065210 A1 Mar. 8, 2018

Related U.S. Application Data (63) Continuation-in-part of application No. 14/695,556, filed on Apr. 24, 2015, now abandoned.

(51) Int. Cl.
    *C03B 33/095* (2006.01)
    *B23K 26/364* (2014.01)
    (Continued)

(52) U.S. Cl.
    CPC ...... *C03B 33/0955* (2013.01); *B23K 26/0604* (2013.01); *B23K 26/14* (2013.01); *B23K 26/364* (2015.10); *B23K 26/38* (2013.01); *B23K 26/703* (2015.10); *B28D 5/0011* (2013.01); *B23K 2101/40* (2018.08); *B23K 2103/50* (2018.08);
(Continued)

(58) Field of Classification Search
CPC .. C03B 33/10; C03B 33/093; C03B 33/09555
See application file for complete search history.

(56) References Cited

U.S. PATENT DOCUMENTS

| 5,826,772 A * | 10/1998 | Ariglio | B23K 26/0736 225/2 |
| 6,420,678 B1 * | 7/2002 | Hoekstra | B23K 26/0604 219/121.75 |

(Continued)

FOREIGN PATENT DOCUMENTS

| AT | 13206 U1 * | 8/2013 | ........... B23K 26/009 |
| CN | 1408498 A | 4/2003 | |

(Continued)

*Primary Examiner* — Jennifer S Matthews
(74) *Attorney, Agent, or Firm* — Li & Cai Intellectual Property (USA) Office (57) ABSTRACT

A brittle object cutting apparatus and the method thereof are disclosed. Wherein, the brittle object cutting apparatus comprises a first heating laser unit, a second heating laser unit, a scribing laser unit, two cooling units and a processing module. A heating laser from the heating laser units respectively located on opposite sides of a scribing laser from the scribing laser unit, and a coolant of the cooling unit followed behind the heating laser. In the moving process of the brittle object, the processing module controls the scribing laser for a scribing operation, and controls one of the heating lasers and the coolant form one of the cooling units to heat and cool the brittle object. As a result, the machining time of dicing the brittle objects may be effectively reduced.

10 Claims, 7 Drawing Sheets

(51) Int. Cl.
  *B28D 5/00* (2006.01)
  *B23K 26/06* (2014.01)
  *B23K 26/14* (2014.01)
  *B23K 26/38* (2014.01)
  *B23K 26/70* (2014.01)
  *B23K 103/00* (2006.01)
  *B23K 101/40* (2006.01)

(52) U.S. Cl.
  CPC ...... *B23K 2103/52* (2018.08); *B23K 2103/54* (2018.08); *B23K 2103/56* (2018.08)

(56) References Cited

U.S. PATENT DOCUMENTS

| | | | |
|---|---|---|---|
| 6,423,930 B1 * | 7/2002 | Matsumoto | C03B 33/091 |
| | | | 219/121.69 |
| 7,642,483 B2 * | 1/2010 | You | C03B 33/093 |
| | | | 219/121.68 |
| 7,880,118 B2 * | 2/2011 | Cheng | B28D 1/221 |
| | | | 219/121.72 |
| 8,212,180 B2 | 7/2012 | Eberhardt et al. | |
| 8,791,385 B2 * | 7/2014 | Tamura | B23K 26/0608 |
| | | | 219/121.69 |
| 2002/0046997 A1 | 4/2002 | Nam et al. | |
| 2003/0062348 A1 * | 4/2003 | Jeon | C03B 33/093 |
| | | | 219/121.72 |
| 2004/0228004 A1 | 11/2004 | Sercel et al. | |
| 2005/0153525 A1 | 7/2005 | Liu | |
| 2013/0221053 A1 | 8/2013 | Zhang | |
| 2013/0280465 A1 | 10/2013 | Matsumoto | |

FOREIGN PATENT DOCUMENTS

| | | | | |
|---|---|---|---|---|
| CN | 1967805 A | | 5/2007 | |
| DE | 102004014276 A1 | * | 10/2005 | ......... C03B 33/0235 |
| JP | 2000281373 A | * | 10/2000 | ........... C03B 33/091 |
| JP | 2001151525 A | * | 6/2001 | ........... C03B 33/093 |
| JP | 2008153420 A | | 7/2008 | |
| JP | 2010123797 A | | 6/2010 | |
| KR | 100626554 B1 | * | 9/2006 | |
| TW | 583046 B | | 4/2004 | |
| TW | 200610604 A | | 4/2006 | |
| TW | 200613081 A | | 5/2006 | |
| TW | 201210732 A | | 3/2012 | |
| TW | 201210958 S | | 3/2012 | |
| TW | 201233649 A | | 8/2012 | |
| WO | WO 93/20015 A1 | | 10/1993 | |
| WO | WO-9707927 A1 | * | 3/1997 | ......... B23K 26/0736 |

\* cited by examiner

BRITTLE OBJECT CUTTING APPARATUS AND CUTTING METHOD THEREOF

CROSS-REFERENCE O RELATED APPLICATION

This application is a continuation-in-part of U.S. patent application Ser. No. 14/695,556, filed on Apr. 24, 2015, in the United States Patent and Trademark Office, the disclosure of which is incorporated herein in their entirety by reference.

BACKGROUND OF THE INVENTION

1. Field of the Invention

The present invention relates to a cutting apparatus and cutting method thereof, in particular to a brittle object cutting apparatus and cutting method thereof, which apply laser to generate thermally-induced mechanical stress in order to cut brittle objects.

2. Description of the Related Art

Cutting brittle materials such as glass, sapphire, silicon, gallium arsenide or ceramics by producing a notch along the desired dividing line, along which breaking stresses are subsequently produced by subjection to mechanical forces, which leads to the complete separation of the brittle material, is already known.

In order to cut the brittle material in this way, the depth of the notch must be at least one-third of the flat material thickness. The notch can be applied mechanically or by means of lasers. Particularly for dicing chips from substrates (wafers), laser methods that create a notch by ablation into the material are increasingly being used. The notches are typically only a few μm wide and have an approximate depth of one third the flat material thickness. The notch depth is produced proportionately to the total thickness of the flat material, depending on its brittleness. It is disadvantageous that every volume of removed material potentially contributes to the microscopic contamination of the material being processed. Since the aspect ratio between notch width and notch depth is critical to all these laser processes, complex apparatuses are needed and the notch is created relatively slowly. Deep notches for thick wafers therefore require increasingly more process time.

Such methods are disclosed in US 20050153525 or US 20040228004, for example, the contents of each of which are hereby incorporated by reference in their entirety. After production of the notches, the wafer is completely cut by applying mechanical (impulse) energy or forces, for example tensile force (stretching of films), bending forces (breaking over ridges) or a combination thereof.

Mechanical application of breaking forces is geometrically relatively imprecise. Therefore fracture flaws can occur if the breakage lines do not run perpendicular to the material thickness or if two breakage lines intersecting at one point do not meet one another at the intended angle. Particularly in chip production, such breaking faults lead to a reduction of yield and must therefore be avoided. In addition, material particles split off, which can entail a macroscopic contamination of the surface of the flat material.

Instead of cutting a flat material by material removal, e.g., in form of a notch as described, a known method is to produce a mechanically-induced initial crack, which is subsequently propagated through the flat material by means of thermally-induced mechanical stresses. Such a method (thermal laser separation, TLS) is described in WO 93/20015, the content of which is hereby incorporated by reference in its entirety. It is disadvantageous particularly if a flat material separated into several parallel strips is to be cut in a second axis, for example, orthogonally to the first separation direction, for example, into individual rectangles in the dicing of a wafer into individual chips. Since a new initial crack must be made at the beginning of each dividing line in the first separation direction, the process is very time-consuming and the mechanical scoring system is subject to high wear.

Similarly, a method for cutting brittle flat materials by laser beam is disclosed in U.S. Pat. No. 8,212,180, in which the notch generating process and the thermally-induced mechanical stress applying process are two independent processes. Thus, the affected points on the brittle flat materials may be shifted between the two processes, leading to problems such as the breakage lines do not run perpendicular to the material thickness.

Therefore, it is a primary issue to provide a brittle object cutting apparatus and method thereof for cutting a brittle object to solve the above mentioned flaws. The details of one or more embodiments of the invention are set forth in the descriptions below. Other features, objects or advantages of the invention will be apparent from the following drawings and detailed descriptions of the embodiments, and also from the appending claims.

SUMMARY OF THE INVENTION

In view of the shortcomings of the prior art, it is a primary objective of the present invention to provide a brittle object cutting apparatus and method thereof for cutting a brittle object.

To achieve the aforementioned objective, the present invention provides a brittle object cutting apparatus, it comprises a scribing laser unit, configured to emit a scribing laser to scribe a brittle object by a scribing laser focusing spot, provided by a focusing optics of an optical path of the scribing laser onto a surface of the brittle object, a first heating laser unit, configured to emit a first heating laser to heat the brittle object by the first heating laser focusing spot, provided by a focusing optics of an optical path of the first heating laser onto a surface of the brittle object directly behind or on a certain distance from the scribing laser focusing spot; a second heating laser unit, configured to emit a second heating laser to heat the brittle object by the second heating laser focusing spot, provided by a focusing optics of an optical path of the second heating laser onto the surface of the brittle object directly behind or on the certain distance from the scribing laser focusing spot, wherein the first heating laser focusing spot and the second heating laser focusing spot are respectively located on opposite sides of the scribing laser focusing spot; a first cooling unit, configured to provide a first coolant spot to cool the brittle object, and the first coolant spot being disposed onto the surface of the brittle object directly behind the first heating laser focusing spot of the first heating laser unit, and not between the scribing laser focusing spot and the first laser heating focusing spot; a second cooling unit, configured to provide a second coolant spot to cool the brittle object, and the second coolant spot being disposed onto the surface of the brittle object directly behind the second heating laser focusing spot of the second heating laser unit, and not between the scribing laser focusing spot and the second laser heating focusing spot; and a processing module, configured to selectively control the scribing laser unit, the first heating laser unit and the first cooling unit, or the scribing laser unit, the second heating laser unit and the second cooling unit to cut along the one of a plurality of first-axis or second-axis dividing lines on the brittle object; wherein the processing module is based on a machining operation to simultaneously perform the scribing laser unit, the first heating laser unit and the first cooling unit, or to simultaneously perform the scribing laser unit, the second heating laser unit and the second cooling unit, the machining operation is, while cutting the brittle object in a first machining direction along the one of the plurality of first-axis or second-axis dividing lines, the processing module controls the scribing laser unit to scribe the brittle object, and controls the first heating laser unit and the first cooling unit to perform the heating and cooling processes on the brittle object following a scribing line, the scribing laser focusing spot, the first heating laser focusing spot, and the first coolant spot being applied to the brittle object at a different positions, and along a same dividing line at a same time or with a predetermined consequence delays between the scribing laser unit, the first heating laser unit, and the first cooling unit; and while cutting the brittle object in a second machining direction opposite to the first direction, the processing module controls the scribing laser unit to scribe, and controls the second heating laser unit and the second cooling unit to perform the heating and cooling processes on the brittle object following the scribing line, the scribing laser focusing spot, the second heating laser focusing spot, and the second coolant spot being applied to the brittle object at a different positions at a same time or with a predetermined consequence delays between the scribing laser unit, the second. heating laser unit, and the second cooling unit; to heat a same object's dividing line length due to an existing certain distance between the focusing spots of the scribing laser unit and the second heating laser unit.

Preferably, a machining direction of the scribing laser, the first heating laser and the coolant may be opposite to a machining direction of the scribing laser, the second heating laser and the coolant.

Preferably, the scribing laser may scribe the plurality of first-axis dividing lines with a predetermined distance, originated from an edge of the brittle object, on the brittle object, and the scribing laser scribes the plurality of second-axis dividing lines completely or only scribes intersections between the plurality of first-axis and second-axis dividing lines with the predetermined distance on the brittle object.

To achieve the aforementioned objective, the present invention further provides brittle object cutting apparatus for cutting a brittle object, comprising: a scribing laser unit, configured to emit a scribing laser on the brittle object via a scribing optical path; a heating laser unit, configured to emit a heating laser; a first light guide unit, configured to guide the heating laser to heat the brittle object via a first optical path or to pass the first light guide unit, or configured to selectively guide a portion of the heating laser to pass a first optical path and another portion of the heating laser to pass through the first light guide unit; a second light guide unit, configured to guide the heating laser passed from the first light guide unit to heat the brittle object via a second optical path, wherein the first heating optical path and the second heating optical path respectively located on opposite sides of the scribing optical path when the first heating optical path, the second heating optical path and the scribing optical path are emitted on the brittle object; two cooling units, configured to provide a coolant to cool the brittle object, one of the two cooling units disposed at a side of the first optical path and opposite to the scribing laser so as to cool the brittle object irradiated by the first heating laser, another one of the two cooling units disposed at a side of the second optical path and opposite to the scribing laser so as to cool the brittle object irradiated by the second heating laser; and a processing module, configured to selectively control the scribing laser unit, the heating laser unit, the first light guide unit and the cooling unit to cut along one of a plurality of first-axis and second-axis dividing lines on the brittle object sequentially with the scribing laser in the scribing optical path, the heating laser in the first heating optical path and the coolant, or sequentially with the scribing laser in the scribing optical path, the heating laser in the second heating optical path and the coolant in a machining operation, wherein the heating laser in the first optical path and the coolant, or the heating laser in the second optical path and the coolant processes on the brittle subject simultaneously.

Preferably, a machining direction of the scribing laser in the scribing optical path, the heating laser in the first heating optical path and the coolant may be opposite to a machining direction of the scribing laser in the scribing optical path, the heating laser in the second heating optical path and the coolant.

Preferably, the scribing laser may scribe the plurality of first-axis dividing lines with a predetermined distance, originated from an edge of the brittle object, on the brittle object, and the scribing laser scribes the plurality of second-axis dividing lines completely or only scribes intersections between the plurality of first-axis and second-axis dividing lines with the predetermined distance on the brittle object.

To achieve the aforementioned objective, the present invention further provides a method of cutting a brittle object with a plurality of first-axis and second-axis dividing lines, comprising steps of: providing a scribing laser unit to emit a scribing laser; providing a first heating laser unit to emit a first heating laser; providing a second heating laser unit to emit a second heating laser; scribing the brittle object by emitting the scribing laser along one of the plurality of first-axis and second-axis dividing lines on the brittle object; and heating the brittle object by selectively applying the first heating laser or the second heating laser and cooling the heated brittle object via a coolant providing by a cooling unit right after heating by the first heating laser or the second heating laser along one of the plurality of first-axis and second-axis dividing lines, wherein the scribing step, and the heating step and the cooling step are performed in the same machining operation.

Preferably, the method of cutting a brittle object with a plurality of dividing lines may further comprise the step of: adjusting emitting positions of the first heating laser and the second heating laser, respectively, on the brittle object to be at lateral sides of an emitting position of the scribing laser on the brittle object.

Preferably, a machining direction of the scribing laser, the first heating laser and the coolant may be opposite to a machining direction of the scribing laser, the second heating laser and the coolant.

Preferably, the method of cutting a brittle object with a plurality of dividing lines may further comprise the step of: controlling the scribing laser to scribe the plurality of first-axis dividing lines in a with a predetermined distance, originated from an edge of the brittle object, on the brittle object.

Preferably, the method of cutting a brittle object with a plurality of dividing lines may further comprise the step of: controlling the scribing laser to scribe the plurality of second-axis dividing lines completely or only scribes intersections between the plurality of first-axis dividing lines and the plurality of second-axis dividing lines with the predetermined distance on the brittle object.

The brittle object cutting apparatus and method thereof for cutting a brittle object according to the present invention have one or more of the following advantages:

(1) The brittle object cutting apparatus and method thereof simultaneously perform the processes of scribing, heating and cooling, thereby enhancing the edge quality of the brittle objects.

(2) The brittle object cutting apparatus and method thereof set up the heating laser at lateral sides of the scribing laser, such that the heating laser located behind the scribing laser during the machining process, i.e. the brittle objects are irradiated with the scribing laser followed by the heating laser in both forward and reverse direction without rotating the brittle object, thereby saving cycle time of moving the brittle object and further improving efficiency.

(3) The brittle object cutting apparatus and method thereof are provided with the first light guide unit and the second light guide unit so as to form the first heating laser and the second heating laser, separately, thereby reducing the amount of heating laser units and saving cost.

BRIEF DESCRIPTION OF THE DRAWINGS

The features, objects or advantages of the invention will be apparent from the following drawings and detailed descriptions of the embodiments.

DESCRIPTION OF THE PREFERRED EMBODIMENTS

The present invention is illustrated by the following examples. However, it should be understood that the invention is not limited to the specific details of these examples. Those in the art will understand that a number of variations may be made in the disclosed embodiments, all without departing from the scope of the invention, which is defined solely by the appended claims. The same component will be described with the same reference numeral. In addition, the arrow in the figures indicates the moving direction of the brittle object.

In the following descriptions, the brittle object is embodied as wafer, such as sapphire wafers. However, other brittle objects, such as glass, silicon, gallium arsenide or ceramics, may be applied. The following preferred embodiments should not be construed as limitations to the present invention.

In the embodiments, the plurality of dividing lines on the brittle objects may comprise a plurality of first-axis dividing lines and a plurality of second-axis dividing lines. Wherein, the first-axis may be perpendicular to the second-axis. The brittle object cutting apparatus according to the present invention individually cuts along the plurality of first-axis dividing lines while continuously moving the brittle object back and forth, i.e. forward and reverse direction. Then, the brittle object cutting apparatus according to the present invention subsequently and individually cuts along the plurality of second-axis dividing lines while continuously moving the brittle object back and forth, thereby dicing the brittle object.

Figure 1:
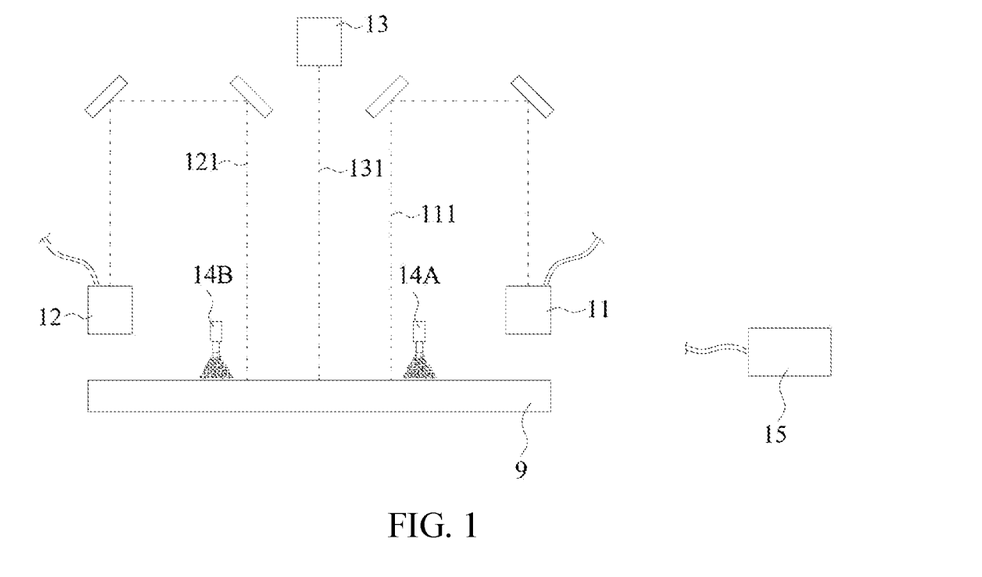
FIG. 1 is a structurally schematic view of the first embodiment of the brittle object cutting apparatus according to the present invention.

With reference to FIG. 1 for a structurally schematic view of the first embodiment of the brittle object cutting apparatus according to the present invention, the brittle object cutting apparatus for cutting a brittle object comprises a first heating laser unit 11, a second heating laser unit 12, a scribing laser unit 13, two cooling units 14A and 14B, and a processing module 15. The first heating laser unit 11 and the second heating laser unit 12 may be a $CO_2$ laser, and the first heating laser unit 11 may emit a first heating laser 111 to heat the brittle object 9 by the first laser focusing spot, provided by the focusing optics 16 of the optical path of the first heating laser 111 onto the surface of the brittle object 9 directly behind or on the certain distance from the scribing laser focusing spot of the scribing laser unit 13, and the second heating laser unit 12 may emit a second heating laser 121 to heat the brittle object 9 by the second laser focusing spot, provided by the focusing optics 16 of the optical path of the second heating laser 121 onto the surface of the brittle object 9 directly behind or on the certain distance from the scribing laser focusing spot of the scribing laser unit 13. The scribing laser unit 13 may be a UV laser, and the scribing laser unit 13 may emit a scribing laser 131 on the brittle object 9 by the scribing laser focusing spot, provided by the focusing optics 16 of the optical path of the scribing laser 131 onto the surface of the brittle object 9, wherein the first heating laser 111 and the second heating laser 121 respectively located on opposite sides of the scribing laser 131 when the first heating laser 111, the second heating laser 121 and the scribing laser 131 are emitted on the brittle object 9. That is, the first heating laser 111 is located behind the scribing laser 131 while machining in the forward direction, however, the second heating laser 121 is located behind the scribing laser 131 while machining in the reverse direction. The cooling units 14 may provide a coolant to cool the brittle object 9; wherein one of the two cooling units 14A disposed at a side of the first heating laser 111 and opposite to the scribing laser 131 so as to cool the brittle object 9 irradiated by the first heating laser 111 and the spot of the cooling units 14A is disposed onto the surface of the brittle object 9 directly behind the first laser focusing spot of the scribing laser unit 13, another one of the two cooling units 14B disposed at a side of the second heating laser 121 and opposite to the scribing laser 131 so as to cool the brittle object 9 irradiated by the second heating laser 121 and the spot of the second cooling unit 14B IS disposed onto the surface of the brittle object 9 directly behind the second laser focusing spot of the scribing laser unit 13. The processing module 15 may be a central processing unit (CPU) or a microcontroller unit (MCU). The processing module 15 selectively controls the scribing laser unit 13, the first heating laser unit 11 and the cooling unit 14A, or controls the scribing laser unit 13, the second heating laser unit 12 and the another cooling unit 14B to perform a machining operation. Thus, in one machining operation, e.g. in machining along a first axis dividing line, the scribing laser 131, the first heating laser 111 and the coolant are sequentially applied along one of the plurality of dividing lines on the brittle object 9; or the scribing laser 131, the second heating laser 121 and the coolant are sequentially applied along one of the plurality of dividing lines on the brittle object 9. It shall be noted that the first heating laser unit 11 and the cooling unit 14A, or the second heating laser unit 12 and the another cooling unit 14B simultaneously heats and cools the brittle object, respectively.

Figure 10:
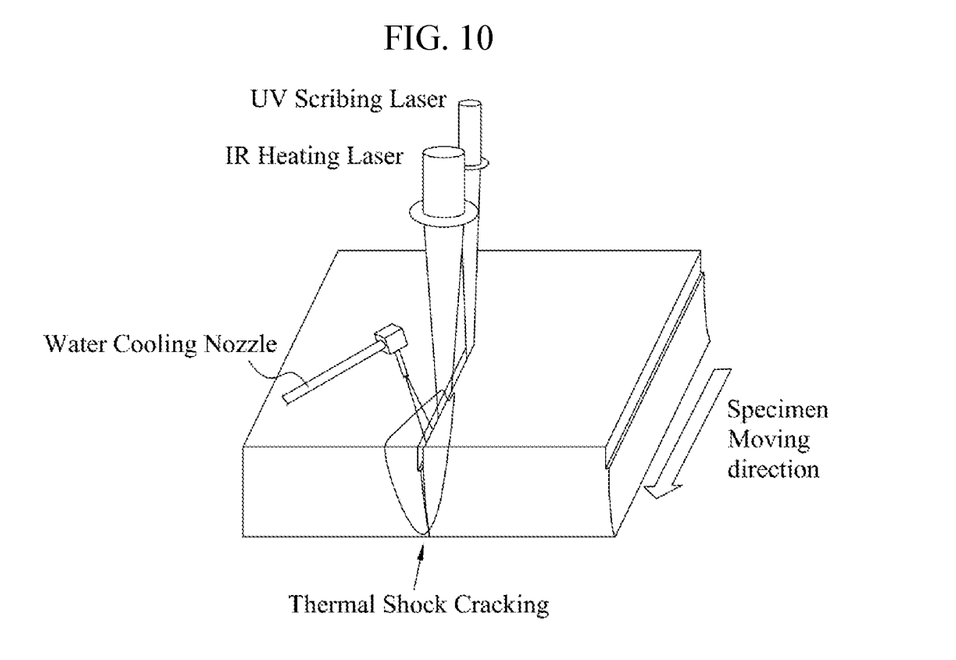
FIG. 10 is a schematic view of the method of cutting brittle object according to the present invention.

In the machining operation, while cutting the brittle object 9 in a first machining direction along one of the plurality of first-axis or second-axis dividing lines, the processing module 15 controls the scribing laser unit 13 to scribe the brittle object 9, and controls the first heating laser unit 11 and the cooling unit 14A to perform the heating and cooling processes on the brittle object 9 following the scribing line, the scribing laser 131, and the first heating laser 111, and the first coolant spot is applied to the brittle object 9 at the different positions, and along the same dividing line at a same time or with the predetermined consequence delays between the scribing laser unit 13, the heating laser unit 11, and the first cooling unit to heat the same object's dividing line length due to the existing certain distance between the focusing spots of the scribing laser unit 13 and the heating laser unit 11. Wherein, the scribing laser 131 radiates through the focusing optics 16 of the scribing optical path and the first heating laser 111 radiates through the focusing optics 16 of the first heating optical path, the scribing laser 131 and the first heating laser 111 are applied to the brittle object 9 simultaneously or with the predetermined delays, and the first coolant spot cools the heated brittle object 9 right after the first heating laser's spot focused by the first focusing optics 16 of the first heating optical path. As illustrated in FIG. 10, the thermal shock cracking 1001 of the brittle object 9 will be induced by the heating of the first heating laser 111 and the subsequent cooling of the cooling unit 14A, along the scribing crack 1002 caused by the scribing laser 131.

In the machining operation, while cutting the brittle object 9 in a second machining direction opposite to the first direction, the processing module 15 controls the scribing laser unit 13 to scribe, and controls the second heating laser unit 12 and the cooling unit 14B to perform the heating and cooling processes on the brittle object 9 following the scribing line, the scribing laser 131, and the second heating laser 121, and the second coolant is applied to the brittle object 9 at the different positions at a same time or with the predetermined consequence delays between the scribing laser unit 13, the heating laser unit 11, and the cooling unit 14B to heat the same object's dividing line length due to the existing certain distance between the focusing spots of the scribing laser unit 13 and the heating laser unit 11. Wherein, the scribing laser 131 radiates through the focusing optics 16 of the scribing optical path and the second heating laser 121 radiates through the focusing optics 16 of the second heating optical path, the scribing laser 131 and the second heating laser 121 are applied to the brittle object 9 simultaneously with the predetermined delays, and the second coolant spot cools the heated brittle object 9 right after the second heating laser's spot, focused by the focusing optics 16 of the second heating optical path.

Of course, one of ordinary skill in the art would appreciate that the brittle object cutting apparatus may further comprise guiding units to guide light, focusing lens, a supporting unit to move the brittle object 9, or a driving unit, which will not be further described here. Wherein, the supporting unit for moving the brittle object 9, or the driving unit thereof are controlled be the processing unit 15, so as to move the brittle object 9 in a first axis or a second axis, or to rotate around a rotation axis. In addition, the focusing lens, mounted on a third axis, may also be controlled by the processing unit 15, so as to focus the laser on the surface of the brittle object 9. The first axis, the second axis, and the rotation axis are together. The third axis is separated from the first axis, the second axis and the rotation axis.

In a preferred embodiment, there may be X-axis, Y-axis with mounted on this stage C axis to rotate (align) the brittle object along dividing lines, and the Z-axis, in which X-axis and Y-axis are used for moving the brittle objects. Z-axis is used to move the objective lenses in order to focus the laser on the surface of the brittle object, instead of moving the brittle object closer or far from the focusing lens. That is, Z-axis is to keep the lens in the housing and change the focus, i.e. working distance (WD) between the lens and the brittle object. In addition, the rotation axis is mounted on the X, Y stage for rotating/aligning the brittle object along the dividing lines, turning the brittle object on 90 degrees after the first direction, e.g. forward direction (+), has been cut, and being vacuum chuck also.

Figure 2:
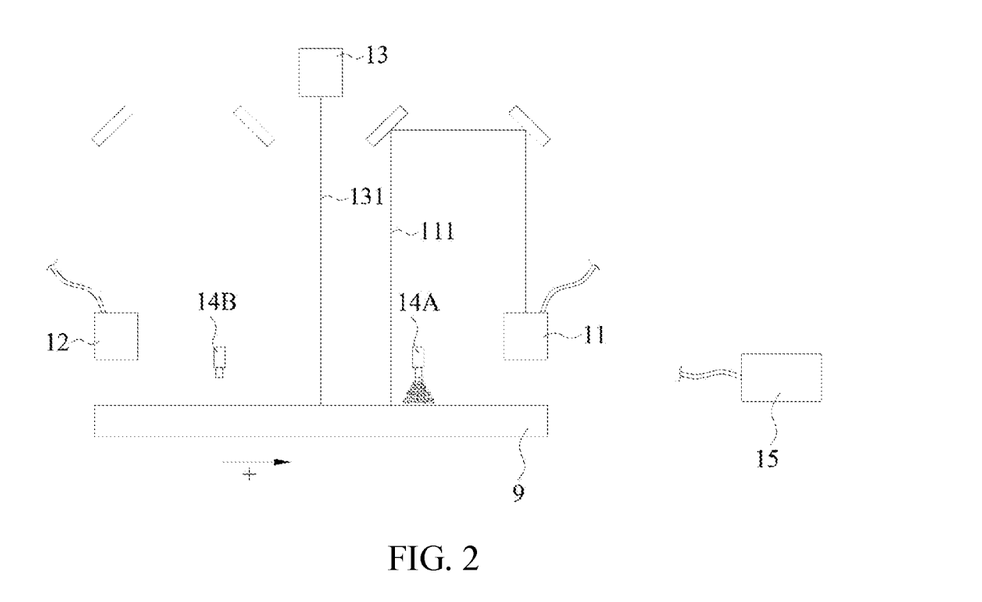
FIG. 2 is a schematic view of the first aspect in the first embodiment of the brittle object cutting apparatus according to the present invention.
Figure 3:
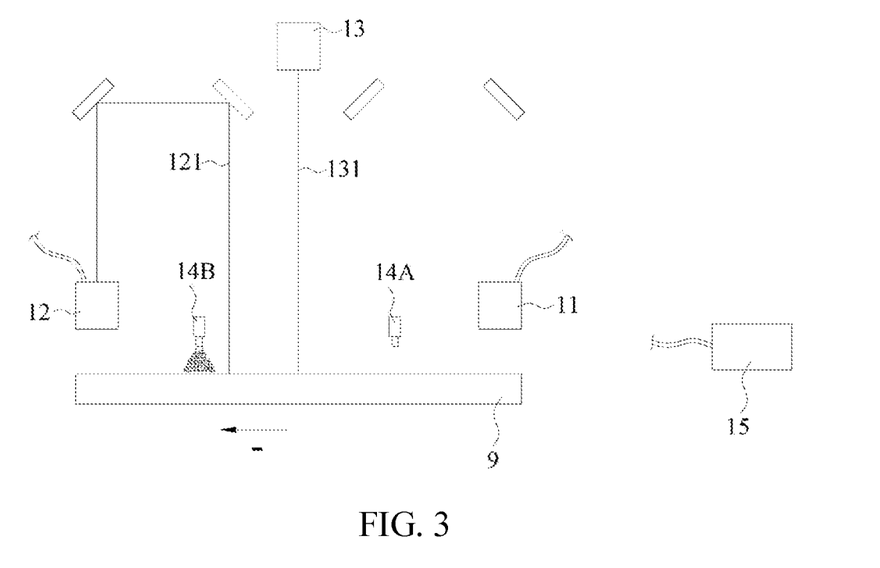
FIG. 3 is a schematic view of the second aspect in the first embodiment of the brittle object cutting apparatus according to the present invention.

With reference to FIGS. 2 and 3 for schematic views of the first aspect and the second aspect in the first embodiment of the brittle object cutting apparatus according to the present invention, for instance, when the brittle object cutting apparatus cuts the brittle object 9 along first axis dividing lines in the forward direction (+), the processing module 15 controls the scribing laser unit 13 to scribe, and the first heating laser unit 11 and the cooling unit 14A to perform the heating and cooling process. Then, when the brittle object cutting apparatus cuts the brittle object 9 along first axis dividing lines in the reverse direction (−), the processing module 15 controls the scribing laser unit 13 to scribe, the second heating laser unit 12 and the another cooling unit 14B to perform the heating and cooling process. In case of that the brittle object cutting apparatus cuts the brittle object 9 along the second-axis dividing lines, the process is similar to those cutting along the first-axis dividing lines and will be further described hereinafter. Therefore, after the brittle object cutting apparatus cuts the brittle object 9 in the forward direction by using the scribing laser unit 13, the first heating laser unit 11 and the cooling unit 14A, sequentially, the scribing laser unit 13, the second heating laser unit 12 and the another cooling unit 14B may be directly applied in the reverse direction in the machining process, thereby reducing the machining time as moving the brittle objects.

In addition, in the machining process of moving the brittle object 9 in the forward direction along the first-axis dividing lines by the brittle object cutting apparatus, the scribing laser unit 13 and the first heating laser unit 11 are applied simultaneously, and the cooling unit 14A cools the heated brittle object right after heating by the first heating laser unit 11. Similarly, in the machining process of moving the brittle object 9 in the reverse direction along the first-axis dividing lines by the brittle object cutting apparatus, the scribing laser unit 13 and the second heating laser unit 12 are applied simultaneously, and the another cooling unit 14B cools the heated brittle object right after heating by the second heating laser unit 12. Therefore, the brittle object cutting apparatus according to the present invention may solve the problems of poor edge quality or low precision due to deviation in prior art.

Figure 4:
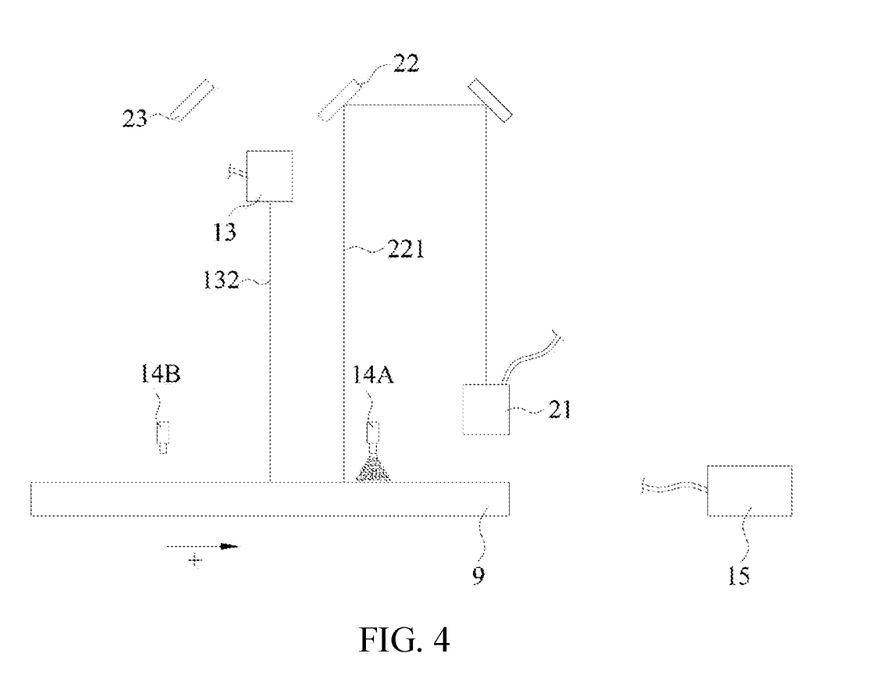
FIG. 4 is a schematic view of the first aspect in the second embodiment of the brittle object cutting apparatus according to the present invention.
Figure 5:
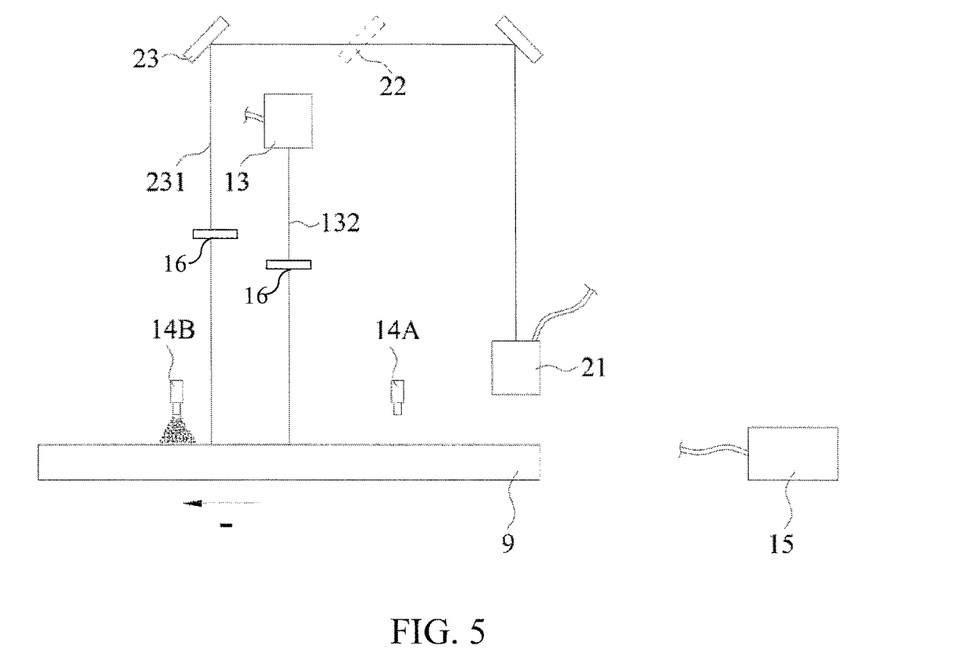
FIG. 5 is a schematic view of the second aspect in the second embodiment of the brittle object cutting apparatus according to the present invention.

With reference to FIGS. 4 and 5 for a schematic view of the first aspect and the second aspect in the second embodiment of the brittle object cutting apparatus according to the present invention, in the instant embodiment, the brittle object cutting apparatus comprises a heating laser unit 21, a first light guide unit 22, a second light guide unit 23, a scribing laser unit 13, two cooling units 14A, 14B and a processing module 15. The heating laser unit 21 may emit a heating laser. The first light guide unit 22 may be movable reflective mirror, or the first light guide unit 22 may be a splitter. Wherein, the detailed description of the first light guide unit 22 being embodied as splitter will be further described in the next embodiment. Particularly, the first light guide unit 22 guides the heating laser to heat the brittle object 9 via a first optical path 221 or to pass the laser radiation to the second light guide unit 23 when the first light guide unit 22 is moved aside. The second light guide unit 23 guides the heating laser passed from the heating laser unit 21 to heat the brittle object 9 via a second optical path 231. The scribing laser unit 13 may emit a scribing laser on the brittle object 9 via a scribing optical path 132, wherein the first heating optical path 221 and the second heating optical path 231 respectively located on opposite sides of the scribing optical path 132, i.e. opposite sides of the scribing laser, when the first heating optical path 221, the second heating optical path 231 and the scribing optical path 132 are aligned on the brittle object 9 along the determined dividing lines. The two cooling units 14A, 14B may provide a coolant to cool the brittle object 9, which is similar to the previous embodiment and will not be further described here. That is, the first optical path 221 is located behind the scribing optical path 132 while machining in a forward direction (+), and the coolant is located behind the first optical path 221, however, the second optical path 231 is located behind the scribing optical path 132 while machining in a reverse direction (−), and the coolant is located behind the second optical path 231. The processing module 15 may selectively control the heating laser unit 21, the first light guide unit 22, the scribing laser unit 13 and the two cooling units 14A, 14B to perform a machining operation. Wherein, the scribing laser in the scribing optical path 132, the heating laser in the first heating optical path 221 and the coolant are sequentially applied along one of a plurality of dividing lines, such as first-axis dividing lines, on the brittle object 9; or the scribing laser in the scribing optical path 132, the heating laser in the second heating optical path 231 and the coolant are sequentially applied along one of a plurality of dividing lines, such as second-axis dividing lines, on the brittle object 9. Similarly, the heating laser in the first optical path 221 and the coolant, or the heating laser in the second optical path 231 and the coolant processes on the brittle subject simultaneously.

For instance, when the brittle object cutting apparatus cuts the brittle object 9 along the first-axis dividing lines in a forward direction, the processing module 15 controls the first light guide unit 22 to change the original optical path of the heating laser unit 21 so as to emit on the brittle object 9 via the first heating optical path 221. At this point, the brittle object cutting apparatus performs the machining process by sequentially applying the scribing laser in the scribing optical path 132 to scribe, and using the heating laser in the first heating optical path 221 and the coolant to heat and cool the brittle object, respectively, along the first-axis dividing lines. However, when the brittle object cutting apparatus cuts the brittle object 9 along the first-axis dividing lines in a reverse direction, the processing module 15 controls the first light guide unit 22 to move it aside without changing the original optical path of the heating laser unit 21 so that the heating laser from the heating laser unit 21 may be received by the second light guide unit 23. Therefore, the second light guide unit 23 may change the original optical path of the heating laser unit 21 so as to emit on the brittle object 9 via the second heating optical path 231. At this point, the brittle object cutting apparatus performs the machining process by sequentially applying the scribing laser in the scribing optical path 132 to scribe, and using the heating laser in the second heating optical path 231 and the coolant to heat and cool the brittle object, respectively, along the first-axis dividing lines.

From the above, after the brittle object cutting apparatus cuts the brittle object 9 in the forward direction by scribing laser, the heating laser in the first heating optical path 221 and the coolant, the heating laser from the second heating optical path 231 and the coolant from the another cooling unit 14B may be directly applied to heat and cool the brittle object 9, so as to cut the brittle object 9 in the reverse direction, thereby reducing the machining time while using only one heating laser unit.

Figure 6:
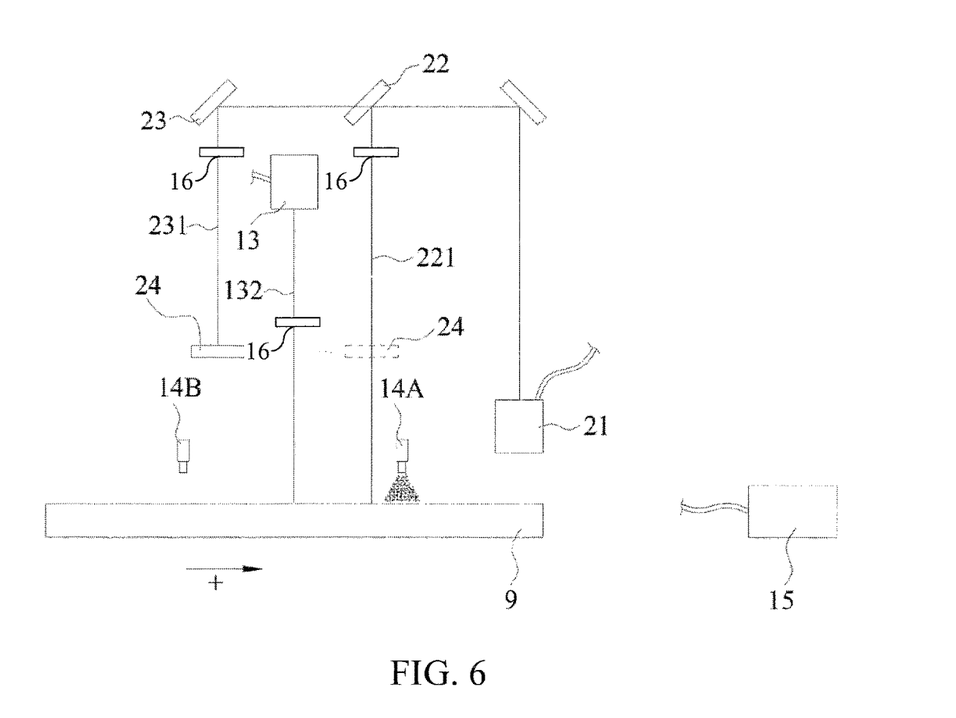
FIG. 6 is a schematic view of the first aspect in the third embodiment of the brittle object cutting apparatus according to the present invention.
Figure 7:
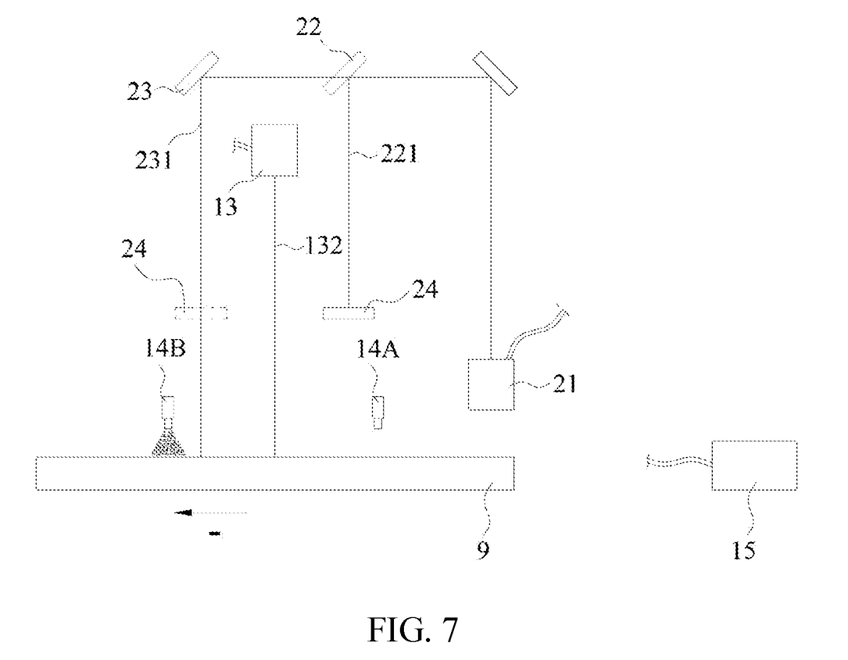
FIG. 7 is a schematic view of the second aspect in the third embodiment of the brittle object cutting apparatus according to the present invention.

Please refer to FIGS. 6 and 7 for a schematic view of the first aspect and the second aspect in the third embodiment of the brittle object cutting apparatus according to the present invention. In the instant embodiment, the first light guide unit 22 is embodied as a splitter. In a preferred embodiment, the transmittance and reflectance of the splitter are 50% and 50%, respectively. However, the transmittance and reflectance of the splitter may be varied depending on the machining process or the configuration designed by designers. For instance, the transmittance and reflectance of the splitter may respectively be 40% and 60%, 30% and 70%, etc.

In the present embodiment, the configuration of the components in the apparatus is similar to the previous embodiment and will not be further described herein. However, it should be noted that there's a movable blocking unit 24 in both the first heating optical path 221 and the second heating optical path 231, respectively. The movable blocking units 24 selectively blocks the heating lasers either in the first heating optical path 221 or in the second heating optical path 231 under the control of the processing module 15.

For example, when the brittle object cutting apparatus cuts the brittle object 9 along the first-axis dividing lines in a forward direction (+), the processing module 15 controls the blocking unit 24 in the second heating optical path 231 moving to block the heating laser in the second heating optical path 231, so that only the heating laser in the first heating optical path 221 irradiates on the brittle object 9. At this point, the brittle object cutting apparatus performs the machining process by sequentially applying the scribing laser in the scribing optical path 132 to scribe, and using the heating laser in the first heating optical path 221 and the coolant to heat and cool the brittle object, respectively, along the first-axis dividing lines. Then, when the brittle object cutting apparatus cuts the brittle object 9 along the first-axis dividing lines in a reverse direction (−), the processing module 15 controls the blocking unit 24 in the first heating optical path 221 moving to block the heating laser in the first heating optical path 221, so that only the heating laser in the second heating optical path 231 irradiates on the brittle object 9. At this point, the brittle object cutting apparatus performs the machining process by sequentially applying the scribing laser in the scribing optical path 132 to scribe, and using the heating laser in the second heating optical path 231 and the coolant to heat and cool the brittle object, respectively, along the first-axis dividing lines.

Figure 8:
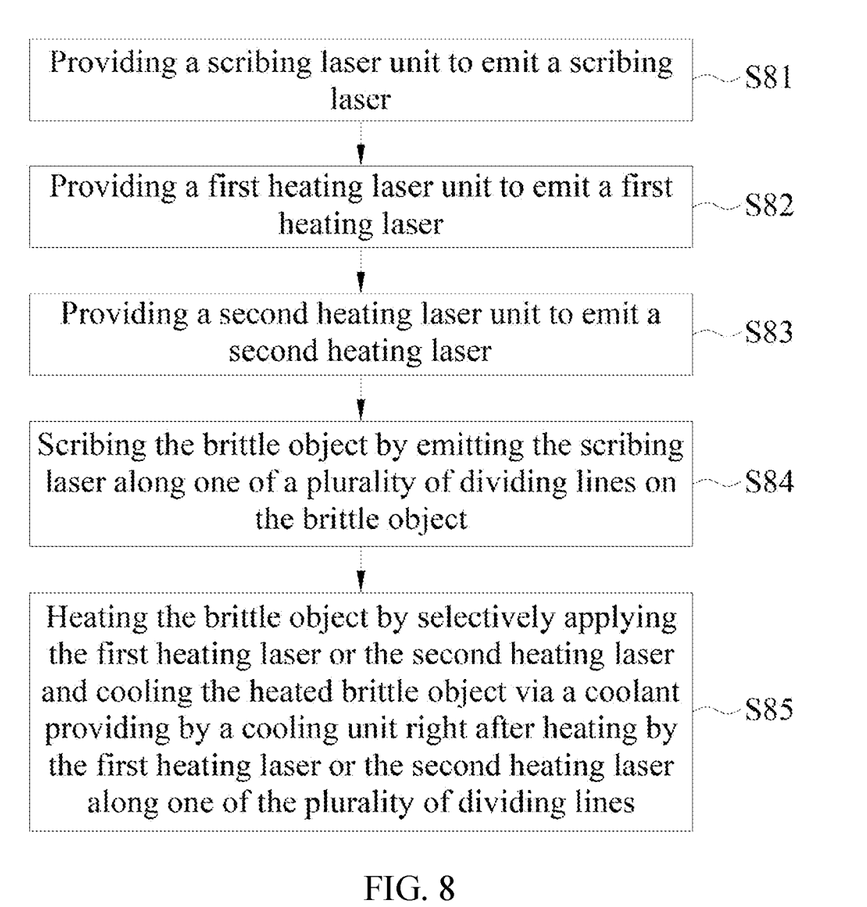
FIG. 8 is a flow chart of the method of cutting brittle object according to the present invention.

With reference to FIG. 8 for a flow chart of the method of cutting brittle object according to the present invention, the method of cutting brittle object in the embodiment may be applied in the brittle object cutting apparatus according to the first embodiment of the present invention. However, by adopting various modifications or functionally equivalents without departing from the scope and the spirit of the present invention, the method of cutting brittle object may be applied to the brittle object cutting apparatus according to the second and the third embodiments of the present invention as well. The method of cutting a brittle object comprises the following steps of:

(S81) Providing a scribing laser unit to emit a scribing laser.

(S82) Providing a first heating laser unit to emit a first heating laser.

(S83) Providing a second heating laser unit to emit a second heating laser.

(S84) Scribing the brittle object by emitting the scribing laser along one of a plurality of dividing lines on the brittle object.

(S85) Heating the brittle object by selectively applying the first heating laser or the second heating laser and cooling the heated brittle object via a coolant providing by a cooling unit right after heating by the first heating laser or the second heating laser along one of the plurality of dividing lines. Wherein, the scribing step, and the heating step and the cooling step are performed in the same machining operation while moving of the brittle object.

Figure 9:
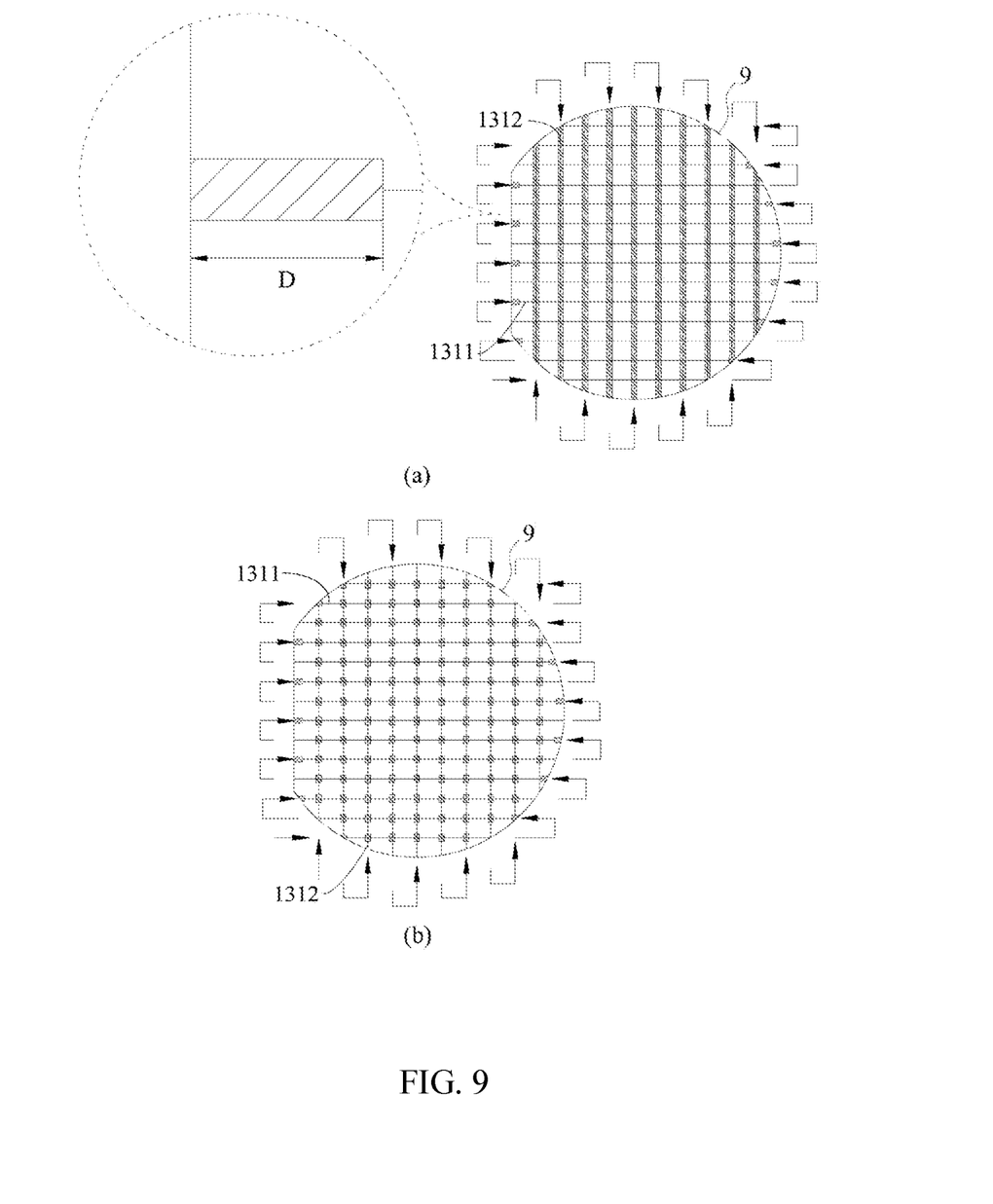
FIG. 9 is a schematic view of the method of cutting brittle object according to the present invention.

Please refer to FIGS. 9 and 10, for a schematic view of the method of cutting brittle object according to the present invention. In the embodiments described above, the notches generating by the scribing laser unit 13 may preferably have a width of 2-10 μm. The depth of the notches may be less than 1/10 of the thickness of the brittle object 9, for instance, 3-15 μm for the 90-130 um wafer thickness. The cutting velocity lies in the range of 100-300 mm/s, or even faster. However, the machining parameters above of the brittle object cutting apparatus according to the present invention is only for illustrations of a few aspects according to the present invention, and should not be construed as limitations.

It should be noted, in the first-axis dividing lines, the scribing laser 131 from the scribing laser unit 13 only scribes a predetermined distance D, which originated from an edge of the brittle object 9, on the brittle object 9. In a preferred embodiment, the predetermined distance D may range from 30 μm to 1000 μm. However, in the second-axis dividing lines, the scribing laser unit 13 may scribe the dividing lines into two distinct scribing patterns. As shown in FIG. 9(a), in an embodiment, the scribing laser unit 13 scribes along the second-axis dividing lines on the brittle object 9 entirely and completely. Contrarily, as shown in FIG. 9(b), in another embodiment, the scribing laser unit 13 only scribes intersections between the plurality of dividing lines with the predetermined distance D, 5-100 um for instance, along the second-axis on the brittle object. Wherein, the center of the predetermined distance D may be the intersection between the plurality of first-axis dividing lines and the plurality of second-axis dividing lines.

In the brittle object cutting apparatus and cutting method thereof according to the present invention, the second-axis dividing lines may be cut after all the first-axis dividing lines have been cut. In addition, the machining process of both the first-axis dividing lines and the second-axis dividing lines may be started in either forward direction or reverse direction. The brittle object cutting apparatus and cutting method thereof according to the present invention may cut each the first-axis dividing lines sequentially or randomly. After each of the first-axis dividing lines is cut, the brittle object 9 may be rotated, e.g. 90 degrees, and each of the second-axis dividing lines may further be sequentially or randomly cut. In the figures, both the first-axis dividing lines and the second-axis dividing lines is sequentially cut as an example, and should not be construed as limitations.

The detailed descriptions and embodiments of the method of cutting a brittle object according to the present invention have been described in the section describing the brittle object cutting apparatus according to the present invention, thus, will not be described again to be concise.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A brittle object cutting apparatus, comprising:
a scribing laser unit, configured to emit a scribing laser to scribe a brittle object by a scribing laser focusing spot, provided by a focusing optic of an optical path of the scribing laser onto a surface of the brittle object, wherein the scribing laser scribes a plurality of first-axis dividing lines with a predetermined length, originated from an edge of the brittle object, on the brittle object,
a first heating laser unit, configured to emit a first heating laser to heat the brittle object by a first heating laser focusing spot, provided by a focusing optic of an optical path of the first heating laser onto a surface of the brittle object directly behind or in a certain distance from the scribing laser focusing spot;
a second heating laser unit, configured to emit a second heating laser to heat the brittle object by a second heating laser focusing spot, provided by a focusing optic of an optical path of the second heating laser onto the surface of the brittle object directly behind or in the certain distance from the scribing laser focusing spot, wherein the first heating laser focusing spot and the second heating laser focusing spot are respectively located on opposite sides of the scribing laser focusing spot;
a first cooling unit, configured to provide a first coolant spot to cool the brittle object, and the first coolant spot being disposed onto a surface of the brittle object directly behind the first heating laser focusing spot of the first heating laser unit, and not between the scribing laser focusing spot and the first laser heating focusing spot;
a second cooling unit, configured to provide a second coolant spot to cool the brittle object, and the second coolant spot being disposed onto a surface of the brittle object directly behind the second heating laser focusing spot of the second heating laser unit, and not between the scribing laser focusing spot and the second laser heating focusing spot; and a processing module, configured to control the scribing laser unit, the first heating laser unit and the first cooling unit to cut along one of a plurality of first-axis or second-axis dividing lines in a forward direction and sequentially control the scribing laser unit, the second heating laser unit and the second cooling unit in a reverse direction to cut along another one of the plurality of first-axis or second-axis dividing lines on the brittle object;

while cutting the brittle object in a first machining direction along the one of the plurality of first-axis or second-axis dividing lines, the processing module controls the scribing laser unit to scribe the brittle object, and controls the first heating laser unit and the first cooling unit to perform the heating and cooling processes on the brittle object following a scribing line, the scribing laser focusing spot, the first heating laser focusing spot, and the first coolant spot being applied to the brittle object at different positions, and along a same dividing line at a same time or with predetermined consequence delays between the scribing laser unit, the first heating laser unit, and the first cooling unit; and while cutting the brittle object in a second machining direction opposite to the first direction, the processing module controls the scribing laser unit to scribe, and controls the second heating laser unit and the second cooling unit to perform the heating and cooling processes on the brittle object following the scribing line, the scribing laser focusing spot, the second heating laser focusing spot, and the second coolant spot being applied to the brittle object at different positions at a same time or with the predetermined consequence delays between the scribing laser unit, the second heating laser unit, and the second cooling unit; to heat a same object's dividing line length due to an existing certain distance between the focusing spots of the scribing laser unit and the second heating laser unit.

2. The brittle object cutting apparatus of claim 1, wherein the scribing laser scribes the plurality of second-axis dividing lines along the full length of the brittle object or only scribes intersections with the plurality of first-axis dividing lines with the predetermined lengths along the full length of the brittle object.

3. A brittle object cutting apparatus, comprising:
a scribing laser unit, configured to emit a scribing laser on the brittle object by a scribing laser focusing spot, provided by the focusing optics of the optical path of the scribing laser onto the surface of the brittle object;
a heating laser unit, configured to emit a heating laser to heat the brittle object by a heating laser focusing spot;
a first light guide unit, configured to selectively guide the heating laser to heat the brittle object via a first heating optical path or to pass the first light guide unit;
a second light guide unit, configured to guide the heating laser, passing near the moved aside first light guide unit, to heat the brittle object via a second heating optical path, wherein the first heating optical path and the second heating optical path are respectively located on the opposite sides of the scribing optical path without an interference of each other when the first heating optical path, the second heating optical path and the scribing optical path are emitted on the brittle object;
a first cooling unit, configured to provide a first coolant spot to cool the brittle object, and the first coolant spot being disposed onto the surface of the brittle object directly behind the first heating laser focusing spot of the heating laser unit, and not between the scribing laser focusing spot and the first laser heating focusing spot;
a second cooling unit, configured to provide a second coolant spot to cool the brittle object, and the second coolant spot being disposed onto the surface of the brittle object directly behind the second heating laser focusing spot of the heating laser unit, and not between the scribing laser focusing spot and the second laser heating focusing spot; and
a processing module, configured to selectively control the scribing laser unit, the heating laser unit, the first light guide unit, and the first cooling unit to cut along one of a plurality of first-axis or second-axis dividing lines in a forward direction and sequentially control the scribing laser unit, the second heating laser unit, the second guide unit and the second cooling unit in a reverse direction to cut along another one of the plurality of first-axis or second-axis dividing lines of the brittle object;
wherein in a machining operation,
while cutting the brittle object in a first machining direction along the one of the plurality of first-axis or second-axis dividing lines, the processing module controls the scribing laser unit to scribe the brittle object, and controls the heating laser unit and the first cooling unit to perform the heating and cooling processes on the brittle object following the scribing line, the scribing laser focusing spot, and the heating laser focusing spot, and the first coolant spot being applied to the brittle object at different positions, and along the same dividing line at a same time or with the predetermined consequence delays between the scribing laser unit, the heating laser unit, and the first cooling unit; and
while cutting the brittle object in a second machining direction opposite to the first direction, the processing module controls the scribing laser unit to scribe the brittle object, and controls the heating laser unit and the second cooling unit to perform the heating and cooling processes on the brittle object following the scribing line, the scribing laser focusing spot, and the heating laser, and the second coolant being applied to the brittle object at different positions at a same time or with the predetermined consequence delays between the scribing laser unit, the heating laser unit, and the second cooling unit.

4. The brittle object cutting apparatus of claim 3, wherein while cutting in the first machining direction, the scribing laser radiates through the focusing optics of the scribing optical path and the heating laser radiates through the focusing optics of the first heating optical path, the scribing laser and the heating laser are applied to the brittle object simultaneously or with the predetermined delays, and the first coolant spot cools the heated brittle object right after the heating laser spot, focused by the focusing optics of the first heating optical path, and while cutting in the second machining direction, the scribing laser radiates through the focusing optics of the scribing optical path and the second heating laser radiates through the focusing optics of the second heating optical path, the scribing laser and the heating laser are applied to the brittle object simultaneously with the predetermined delays, and the second coolant spot cools the heated brittle object right after the heating laser spot, focused by the focusing optics of the second heating optical path.

5. The brittle object cutting apparatus of claim 3, wherein the scribing laser scribes the plurality of first-axis dividing lines with a predetermined length, originated from an edge of the brittle object, on the brittle object, and the scribing laser scribes the plurality of second-axis dividing lines along the full length of the brittle object or it only scribes the intersections with the plurality of first-axis dividing lines with the predetermined lengths along the full length of the brittle object.

6. A method of cutting a brittle object with a plurality of first-axis and second-axis dividing lines, comprising steps of:
   providing a scribing laser unit to emit a scribing laser;
   providing a first heating laser unit to emit a first heating laser to heat the brittle object;
   providing a second heating laser unit to emit a second heating laser to heat the brittle object;
   providing a first cooling unit to provide a first coolant spot to cool the brittle object;
   providing a second cooling unit to provide a second coolant spot to cool the brittle object;
   scribing the brittle object by emitting the scribing laser along one of the plurality of first-axis and second-axis dividing lines on the brittle object; and
   heating the brittle object by selectively applying the first heating laser or the second heating laser and cooling the heated brittle object via the first coolant spot or the second coolant spot, provided by the first cooling unit or the second cooling unit right after heating by the first heating laser or the second heating laser along the one of the plurality of first-axis or second-axis dividing lines;
   providing a processing module to control the scribing laser unit, the first heater laser unit, and the first cooling unit to cut along one of the plurality of first-axis or second axis dividing lines in a forward direction and sequentially control the scribing laser unit, the second heating laser unit and the second cool unit in a reverse direction to cut along another one of the first-axis or second-axis dividing lines in the brittle object;
   wherein a focusing optic of an optical path of the first heating laser is provided to focus the first heating laser to a first heating laser focusing spot; a focusing optic of an optical path of the second heating laser is provided to focus the second heating laser to a second heating laser focusing spot;
   wherein a scribing step, a heating step, and a cooling step are performed in a machining operation by the scribing laser, first heating laser or the second heating laser, and the first coolant spot or the second coolant spot to the brittle object at the different positions at the same time or with the predetermined consequence delays between the scribing laser unit, one of the first heating laser unit and second heating laser unit, and the first or second cooling unit;
   wherein the first coolant spot is disposed onto the surface of the brittle object directly behind a first heating laser focusing spot of the first heating laser unit that is placed behind or on the certain distance from a laser focusing spot of the scribing laser; and
   wherein the second coolant spot is disposed onto the surface of the brittle object directly behind a second heating laser focusing spot of the second heating laser unit that is placed behind or on the certain distance from the laser focusing spot of the scribing laser.

7. The method of claim 6, further comprising the step of:
   adjusting emitting positions of the first heating laser and the second heating laser, respectively, on the brittle object to be at lateral sides of an emitting position of the scribing laser on the brittle object.

8. The method of claim 7, wherein a machining direction of the scribing laser, the first heating laser and the first coolant spot is opposite to another machining direction of the scribing laser, the second heating laser and the second coolant spot.

9. The method of claim 8, further comprising the step of:
   controlling the scribing laser to scribe the plurality of first-axis dividing lines with a predetermined distance, originated from an edge of the brittle object, on the brittle object.

10. The method of claim 9, further comprising the step of:
    controlling the scribing laser to scribe the plurality of second-axis dividing lines along the full length of the brittle object or it only scribes the intersections with the plurality of first-axis dividing lines with the predetermined lengths along the full length of the brittle object.

* * * * *